Nov. 11, 1969   S. A. J. LILJENDAHL   3,477,949
METHOD OF PURIFYING WASTE LIQUID FROM WATER CLOSETS
AND OTHER SANITARY INSTALLATIONS
Filed Oct. 9, 1967

United States Patent Office 3,477,949
Patented Nov. 11, 1969

3,477,949
METHOD OF PURIFYING WASTE LIQUID FROM WATER CLOSETS AND OTHER SANITARY INSTALLATIONS
Sven Algot Joel Liljendahl, Frihetsvagen 12, Jakobsberg, Sweden
Filed Oct. 9, 1967, Ser. No. 673,745
Claims priority, application Sweden, Oct. 7, 1966, 13,562/66
Int. Cl. C02c 1/40
U.S. Cl. 210—48          8 Claims

ABSTRACT OF THE DISCLOSURE

The waste liquid only from the water closets is sucked into an evacuated reception tank and thereafter transferred to a treatment tank where a basic material is added to bring the pH to a value exceeding 9.3 and then the treated waste liquid from the water closets is mixed with non-excretory waste liquids from sanitary installations other than water closets.

---

Figure 1:
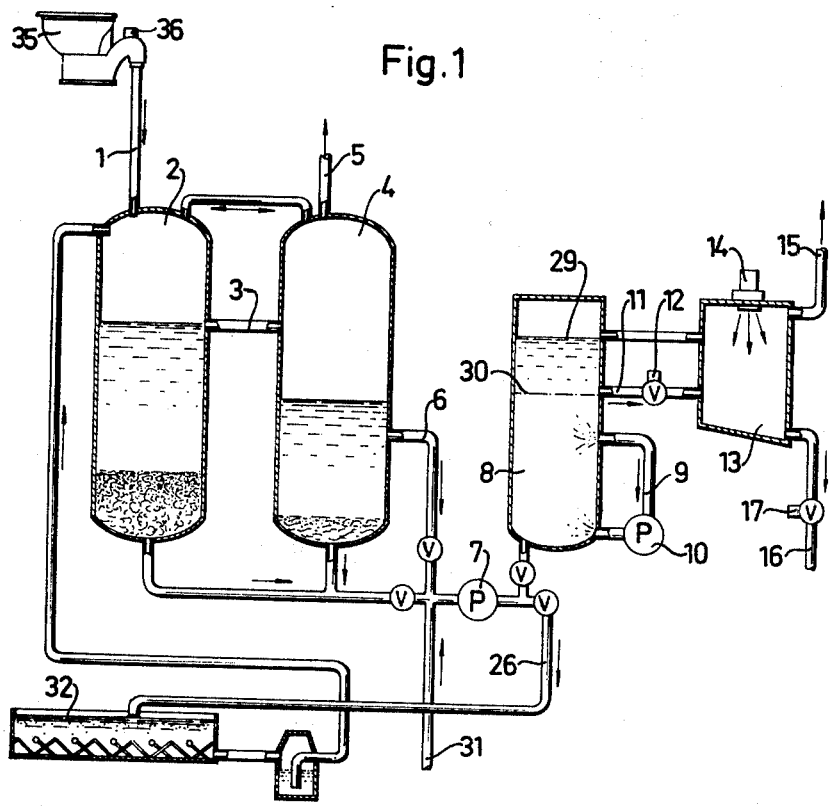

In purifying waste liquid from water closets and other sanitary installations, such as bath tubs, kitchens, wash stands, washing machines, and the like, it is possible to introduce a basic addition in the liquid, for example calcium hydroxide or possibly sodium hydroxide and calcium chloride. Hereby calcium phosphate precipitates and other substances and colloidal particles suspended in the liquid form a flocculent precipitate. If the addition is introduced to such an extent that the pH value of the liquid is increased to at least 9.3 and preferably to 11 or 12, urea is decomposed and transformed to ammonia and carbon dioxide. The precipitates are separated by sedimentation and the gases by aerating.

In practice, however, the carrying out of such a method has to overcome great difficulties since the quantity of water containing the impurities is so great that large quantities of e.g. lime is required to achieve the necessary high alkalinity, but above all, since these large quantities of water with high alkalinity injure the natural and necessary bacterial culture in the recipient and also act detrimentally on higher animals, e.g. on the mucous membranes of fish.

The object of the present invention is to allow purification with a basic addition without high costs and without the purified waste water having a detrimental alkalinity.

In order to fulfill this object the method is carried out in such a manner that in a first step only the waste liquid from the water closets is sucked into an evacuated reception tank and thereafter transferred to a treatment tank in which it is exposed to the basic addition, and in a second step the treated waste liquid from the water closets is mixed with the still untreated waste liquid from the sanitary installations.

To carry out said method the installation should be so designed that the outlets from the water closets and the further flow path through the reception and treatment tanks and the aerating device are completely separated from the outlets from the sanitary installations. Hereby a first limitation is attained of the water quantity to be treated. By using a vacuum system for the transport from the water closets to the treatment tank it is possible to use the transport system as described in detail in United States Patent 3,239,849. For this purpose the individual water closets should be provided with cut-off valves which are opened only for a short duration when the content is to be discharged. The atmospheric pressure then acts in the liquid content in the water closet bowl at its top or external surface, while its inside is exposed only to the lower pressure reigning in the outlet. Consequently, the pressure differential will press the liquid at a great velocity out of the water closet bowl and thereafter transport it to the reception tank. By selecting a small diameter of the evacuated outlet it is possible to establish that the water quantity necessary for each discharge is very small, e.g. ½ to 1 liter. The treatment with the basic addition can thus be limited to a quantity of liquid which is only a few percent of the total quantity of waste liquid. After the waste liquid from the water closet has been purified in this manner and is still strongly basic it is mixed with the untreated waste liquid from the sanitary installations, the phosphorus content of the latter liquid being precipitated as calcium phosphate, while suspended particles form a flocculent precipitate.

Figure 2:
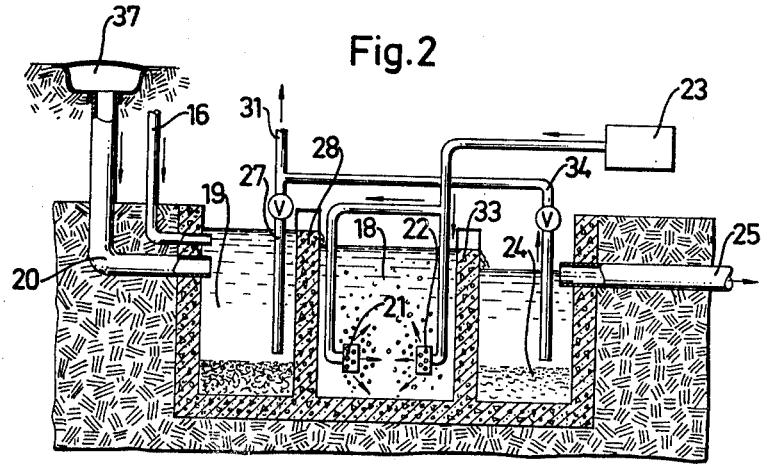

The invention will be described in detail with reference to the accompanying drawing on which FIG. 1 is a diagram illustrating the sedimentation and treatment of the closet liquid with a basic addition and FIG. 2 a diagram illustrating the final phase of the purification process.

A water closet 35 is emptied by the opening of a discharge valve 36 so that the waste liquid from the closet can be transferred through the pipe 1 into a reception tank 2. At a certain level above its bottom said tank is provided with a conduit 3, leading to a compensation tank 4. This compensation tank is provided with a conduit 5 leading to an evacuating plant which maintains a certain vacuum in the tanks 4 and 2 and in the conduit 1. Near its bottom the tank 4 is provided with a discharge pipe 6 which via a pump 7 is connected to a tank 8 adapted for lime treatment. It is provided with a circulating conduit 9 with an associated pump 10. At a certain level in the tank 8 there is a discharge conduit 11 which through a motor controlled valve 12 communicates with an ammonia extractor 13, provided with an inlet compressor 14 and a gas escape pipe 15. A discharge pipe 16 from the tank 13 is controlled by means of a motor valve 17 and leads to a basin 19, FIG. 2. Into this basin leads also a discharge pipe 20 e.g. from a sink 37 in a kitchen for a washing machine or other sanitary installation. In an adjacent basin 18 inlet openings 21, 22 for pressurized air from a compressor 23 are provided. After having passed a third basin 24 the now purified water is conducted to a conduit 25 in which it is mixed with atmospheric precipitate and the like.

At each discharge of the closet 35 the atmospheric pressure forces the small quantity of waste liquid in the closet bowl to rush through the pipe 1 to the evacuated reception tank 2 in which the liquid is accumulated and the larger particles sediment to the bottom and successively undergo a decomposition. When after a plurality of water closet discharges the tank has been filled to a sufficient extent the urine together with the flushing water is led through the pipe 3 into the tank 4 in which an anaerobic putrefaction process is going on by means of which further sedimentation is enhanced. From the tank 4 liquid is transferred periodically through the conduit 6 and the pump 7 to the chemical reactor 8 in which the liquid is mixed with such chemical substances as can precipitate the phosphorus constituent and increase the pH value of the liquid to at least 9.3 or preferably to about 12 pH. This is achieved by adding calcium hydroxide Ca(OH)$_2$ so that the liquid is saturated with lime solution and the desired high pH value is attained. This saturation requires 8–9 kilograms of lime for each cubic meter of liquid. At this high alkalinity the urea

in the liquid is decomposed and a spontaneous discharge of ammonia $NH_3$ and carbon dioxide $CO_2$ occurs already during stirring when the chemical agents are mixed with the liquid. This release of ammonia can be intensified by aerating the liquid. In practical operation it has been proved that a total reduction of the nitrogen content of 80% is reached after one hour of aerating. By a still more intense aerating a still greater reduction may be obtained. By treatment with lime phosphorus is precipitated according to the formula

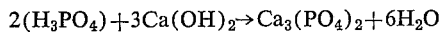

$$2(H_3PO_4) + 3Ca(OH)_2 \rightarrow Ca_3(PO_4)_2 + 6H_2O$$

and at the same time an intense flocculation occurs of substances and colloidal particles suspended in the liquid and after the stirring has ceased the flocculent mass will sediment to the bottom and may be separated as sludge through the pipe 26. It is preferable to flocculate and eliminate this nitrogenous organic substance from the water before any oxidation thereof takes place since during an oxidation said substance is transformed to easily soluble nitrates which are difficult to remove from the water. On top of the sludge a clear liquid is obtained in the tank 8, where the initial total amount of phosphorus has been reduced by up to 99%.

If the pH value is increased to 11.5–12 it can be assumed that all pathogene bacteria have been killed. Further it may be assumed that all virus and intestinal worms have been killed. The clear liquid is passed through the pipe 11 and the motor valve 12 to the degassing tank 13 where a compressor 14 blows air through the tank and the released gaseous products, ammonia and carbon dioxide, escape together with the air through the pipe 15. Via the motor valve 17 the liquid is thereafter passed through the pipe 16 into the tank 19.

Due to the substantial addition of lime to the liquid in the tank 8 the closet waste liquid discharged through the pipe 16 is still strongly alkaline and its final treatment is carried out by mixing it with the wahing liquid or the like which is introduced through the conduit 20 so that a reaction occurs between the purified but alkaline water closet liqid and impurities in the washing liquid. A substantial portion of the phosphorus constituent of the synthetic washing substances are then precipitated. At the same time a floculation occurs of the substances suspended in the washing liquid. The flocculent mass is precipitated as sludge and can be discharged through the pipes indicated at 27. The liquid discharged from the basin 19 flows through an opening in the wall 28 into the basin 18 into which air is introduced through the openings 21 and 22 in order to oxidize the remaining organic soluble substances, which are poor in nitrogen at this stage. From the third basin 24 the purified water flows into the day-water conduit 25.

The operation of the system is as follows: It is assumed that a timing device transmits control impulses to the motor pumps 7 and 10, the valves 12 and 17 and the compressor 14. The pump 7 is first started and fills the tank 8 up to the level 29 after which it is stopped. The lime reactor tank 8 is initially filled with a sufficient excess quantity of calcium hydroxide. The pump 10 is now started so that an intense stirring of the content in the tank 8 occurs. After for instance 5 minutes the pump 10 is stopped. After an idle period of such a duration that the flocculation has had time to produce a sediment below the discharge conduit 11 the valve 12 is opened so that the liquid between the levels 29 and 30 flows out through the conduit 11 to the degassing tank 13. Thereafter the valve 12 is closed again and the compressor 14 is started to introduce air into the tank 13, whereby ammonia and carbon dioxide are successively released and escape through the pipe 15. After a suitable time interval, for instance one hour, the valve 17 is opened and the liquid is allowed to flow down into the basin 19. During this time the kitchen and washing waste water has accumulated in the basin 19 and this water is now mixed with the still strongly alkaline water closet liquid from the pipe 16. The flocculent precipitate and the phosphate precipitate in this tank may be sucked through the pipes 27 and 31 at suitable intervals and pumped through the pump 7 and the pipe 26 to a sludge bed 32. The alkalinity of the purified mixed liquid has now been reduced by the precipitation of phosphate and the dilution with the washing liquid and the mixture thereafter flows through the wall 28 into the basin 18. The compressor 23 blows air through the orifices 21 and 22 so that the remaining organic substances are oxidized which, consequently, are poor in nitrogen in this step. From the basin 18 the liquid flows continuously through the wall 33 down into the basin 24 for final sedimentation. Sludge appearing in this basin is partly returned to the basin 18 as active sludge and partly sucked away through the pipes 34 and 31, the pump 7 and the pipe 26 to the sludge bed 32. The water thereafter flowing out through the conduit 25 is clear and presents a substantial reduction of nutritive salts and organic substances as well as pathogene bacteria virus and eggs from intestinal worms and may thus be discharged into any natural recipient.

I claim:

1. A method of purifying waste liquid from water closets and from essentially non-excretory sanitary installations such as bath tubs, kitchens, wash stands, dish washer, clothes washing machines, and the like, which comprises
    (a) sucking the waste liquid from only the water closets into a reception zone that is maintained under reduced pressure and wherein solids are permitted to settle out,
    (b) passing the supernatant liquid from the reception zone into a treatment zone and adding lime to bring the pH to a value exceeding 9.3 and aerating to expel ammonia,
    (c) mixing the treated liquid from step (b) with the untreated waste liquid from said sanitary installations,
    (d) aerating the mixture of liquids of step (c),
    (e) passing the aerated mixed liquids of step (d) to a settling zone and settling out solids therefrom.

2. A method of purifying waste liquid from water closets and from essentially non-excretory sanitary installations such as bath tubs, kitchens, wash stands, dish washing and clothes washing machines and the like, which comprises:
    (a) withdrawing the waste liquid from only water closets into a reception zone that is maintained under reduced pressure,
    (b) thereafter passing the liquid from the reception zone into a treatment zone,
    (c) adding a basic material to bring the pH of the liquid in the treatment zone to a value exceeding 9.3,
    (d) mixing the treated liquid from step (c) with the untreated waste liquid from said essentially non-excretory sanitary installation in a mixing zone, and
    (e) settling out solids from said mixed liquids.

3. A method according to claim 2 wherein said basic material is lime.

4. A method according to claim 2 wherein the pH in step (c) is between 11 and 12.

5. A method according to claim 2, characterized in that after the basic material is added, the treated liquid is aerated to remove ammonia.

6. A method according to claim 2, characterized in that particles suspended in the unpurified waste liquid from the water closets are allowed to settle in the reception zone.

7. A method according to claim 2, characterized in that after the basic material is added, solids are permitted to settle out.

8. A method according to claim 2, characterized in that the mixed liquids resulting from step (d) are aerated.

References Cited

UNITED STATES PATENTS 3,386,911 6/1968 Albertson _____ 210—18
3,401,115 9/1968 Meyer et al. _____ 210—60

FOREIGN PATENTS 394,942 9/1931 Great Britain.
1,331,126 5/1963 France.

MICHAEL E. ROGERS, Primary Examiner

U.S. Cl. X.R.

4—115; 210—61